(12) United States Patent
Lyons et al.

(10) Patent No.: US 10,919,188 B2
(45) Date of Patent: Feb. 16, 2021

(54) AGED GRANULAR MATERIAL AND A METHOD OF MANUFACTURING AN OBJECT THEREFROM

(71) Applicant: The Boeing Company, Chicago, IL (US)

(72) Inventors: Brett I. Lyons, Burien, WA (US); Christopher J. Robinson, Cottonwood Heights, UT (US); Sergio H. Sanchez, Seattle, WA (US)

(73) Assignee: The Boeing Company, Chicago, IL (US)

( * ) Notice: Subject to any disclaimer, the term of this patent is extended or adjusted under 35 U.S.C. 154(b) by 243 days.

(21) Appl. No.: 15/443,772

(22) Filed: Feb. 27, 2017

(65) Prior Publication Data
US 2018/0243950 A1   Aug. 30, 2018

(51) Int. Cl.
| | |
|---|---|
| *B33Y 10/00* | (2015.01) |
| *B29C 41/00* | (2006.01) |
| *B33Y 70/00* | (2020.01) |
| *B33Y 80/00* | (2015.01) |
| *B29C 41/06* | (2006.01) |
| *B29C 41/46* | (2006.01) |
| *C08K 7/02* | (2006.01) |
| *B29C 64/141* | (2017.01) |
| *B29L 31/30* | (2006.01) |
| *B29K 101/12* | (2006.01) |
| *B29K 105/12* | (2006.01) |
| *B29K 105/00* | (2006.01) |

(52) U.S. Cl.
CPC ............ *B29C 41/003* (2013.01); *B29C 41/06* (2013.01); *B29C 41/46* (2013.01); *B29C 64/141* (2017.08); *B33Y 10/00* (2014.12); *B33Y 70/00* (2014.12); *B33Y 80/00* (2014.12); *C08K 7/02* (2013.01); *B29K 2101/12* (2013.01); *B29K 2105/12* (2013.01); *B29K 2105/251* (2013.01); *B29L 2031/3076* (2013.01)

(58) Field of Classification Search
CPC ......... B33Y 10/00; B33Y 70/00; B33Y 80/00; B29C 64/00; B29C 64/357; B29K 2105/251; B29K 2105/56
USPC .................. 428/902, 903, 402; 264/460, 497
See application file for complete search history.

(56) References Cited

U.S. PATENT DOCUMENTS

| | | | |
|---|---|---|---|
| 2008/0060330 A1* | 3/2008 | Davidson ................ | B29C 64/35 55/529 |
| 2014/0050921 A1* | 2/2014 | Lyons ................... | C22C 1/1084 428/372 |

* cited by examiner

*Primary Examiner* — Matthew D Matzek
(74) *Attorney, Agent, or Firm* — Womble Bond Dickinson (US) LLP

(57) ABSTRACT

An aged granular material and a method of manufacturing an object from the granular material include introducing a granular material into a molding process so as to form the object therefrom. The granular material includes elements including a matrix material having a plurality of reinforcing fibers received therein, the elements of the granular material having a melt viscosity of between about 5 and about 15 grams per 10 minutes and a particle size distribution with a range in particle size of between about 50 and about 595 micrometers.

15 Claims, 3 Drawing Sheets

302 — INTRODUCING A GRANULAR MATERIAL INTO A MOLDING PROCESS SO AS TO FORM THE OBJECT THEREFROM, THE GRANULAR MATERIAL INCLUDING ELEMENTS COMPRISING A MATRIX MATERIAL HAVING REINFORCING FIBERS RECEIVED THEREIN, THE ELEMENTS OF THE GRANULAR MATERIAL HAVING A MELT VISCOSITY OF BETWEEN ABOUT 5 AND ABOUT 15 GRAMS PER 10 MINUTES AND A PARTICLE SIZE DISTRIBUTION WITH A RANGE IN PARTICLE SIZE OF BETWEEN ABOUT 50 AND ABOUT 595 MICROMETERS

AGED GRANULAR MATERIAL AND A METHOD OF MANUFACTURING AN OBJECT THEREFROM

BACKGROUND

Field of the Disclosure

The present disclosure is directed to aged granular material and a method of manufacturing an object therefrom.

Description of Related Art

Generally, when a granular (e.g., powdered) thermoplastic material is utilized in an additive manufacturing process, such as laser sintering, to produce an object (e.g., a part for an airplane), material properties of unused portions of that granular thermoplastic material change with each iteration of the process due to thermal gradients from the additive manufacturing process. For example, a particle size distribution of the unused granular thermoplastic material is increased after an iteration of laser sintering due to exposure from heat generated by the laser. That is, the heat and mechanical handling from the process tends to cause localized melting and consolidation of elements or particles of the granular thermoplastic material, such that some of those particles have a greater average particle size and an associated melt viscosity (e.g., melt flow rate) that is greater than a threshold or maximum melt viscosity and/or average particle size of granular thermoplastic material that is reusable in the additive manufacturing process.

As such, an object manufactured in the additive manufacturing process, from granular thermoplastic materials having material properties that exceed threshold values for reusability, may result in the object having undesirable characteristics. For example, use of granular thermoplastic material having too high of a melt viscosity and/or average particle size in a laser sintering process tends to produce an overly porous object. Accordingly, any of the granular thermoplastic material having a material property change that is not conducive to being reused in an additive manufacturing process or for forming an object therefrom is considered waste material.

Therefore, a need exists for a method of manufacturing an object from an aged granular material, which is environmentally advantageous and displays improved characteristics of the manufactured object.

SUMMARY OF THE DISCLOSURE

An aged granular material and a method of manufacturing an object therefrom are disclosed. In some aspects, the aged granular material comprises elements comprising a matrix material having a plurality of reinforcing fibers received therein, the elements having a melt viscosity of between about 5 and about 15 grams per 10 minutes and a particle size distribution with a range in particle size of between about 50 and about 595 micrometers.

In other aspects, the method of manufacturing the object comprises introducing a granular material into a molding process so as to form the object therefrom, the granular material including elements comprising a matrix material having a plurality of reinforcing fibers received therein, the elements of the granular material having a melt viscosity of between about 5 and about 15 grams per 10 minutes and a particle size distribution with a range in particle size of between about 50 and about 595 micrometers.

In still other aspects, the object comprises a granular material including elements comprising a matrix material having a plurality of reinforcing fibers received therein, the elements of the granular material having a melt viscosity of between about 5 and about 15 grams per 10 minutes and a particle size distribution with a range in particle size of between about 50 and about 595 micrometers.

The aspects, functions and advantages discussed herein may be achieved independently in various example implementations/aspects or may be combined in yet other example implementations/aspects, further details of which may be seen with reference to the following description and drawings.

BRIEF DESCRIPTION OF THE DRAWINGS

Figure 1A:
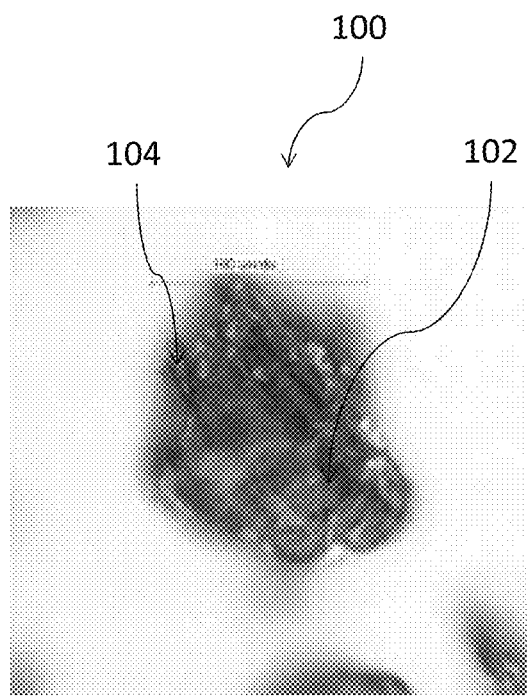
Figure 1B:
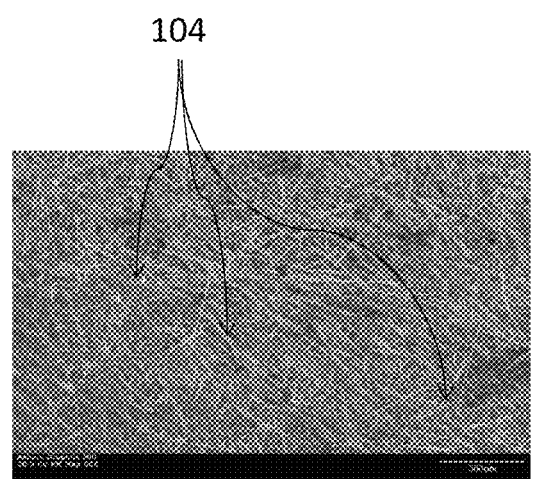
Figure 2:
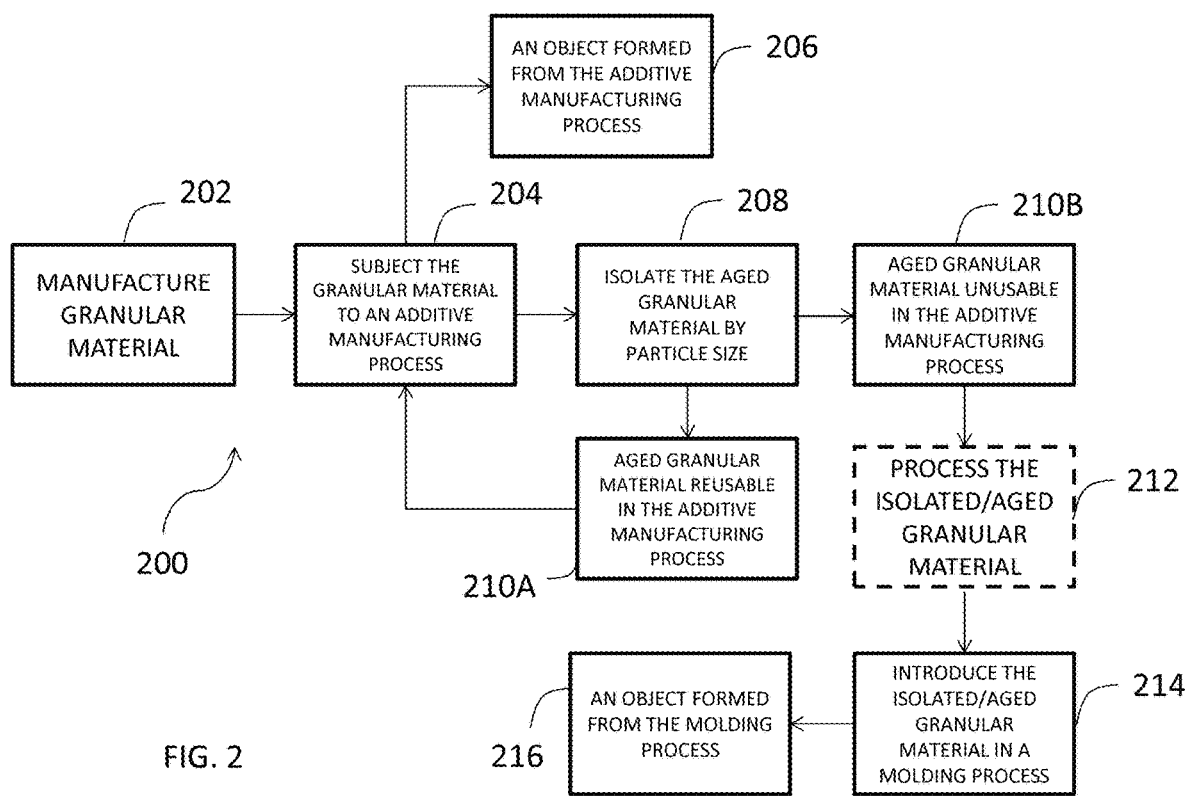

Having thus described the disclosure in general terms, reference will now be made to the accompanying drawings, which are not necessarily drawn to scale, and wherein:

FIG. 1A illustrates an exemplary particle of granular material comprising elements of a matrix material and a plurality of reinforcing fibers according to some aspects of the present disclosure;

FIG. 1B illustrates a plurality of reinforcing fibers according to some aspects of the present disclosure;

FIG. 2 illustrates a flow diagram for an exemplary method of recovering aged granular material from an additive manufacturing process for introducing the aged granular material into a molding process according to some aspects of the present disclosure; and FIG. 3 illustrates a flow diagram for an exemplary method of manufacturing an object from an aged granular material according to some aspects of the present disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will be thorough and complete, will fully convey the scope of the disclosure to those skilled in the art, and will satisfy applicable legal requirements. Like numbers refer to like elements throughout. As used in this specification and the claims, the singular forms "a," "an," and "the" include plural referents unless the context clearly dictates otherwise.

As disclosed herein, aged granular material and a method of manufacturing an object therefrom have applications in the field of aeronautics, as well as other similar fields. In the field of aeronautics, aircraft objects (e.g., aircraft parts, components, elements, etc.) typically have stringent and/or extreme design requirements. These requirements occur from operating environments that have high loads and/or temperatures. Further, these objects are also required to be capable of withstanding impact loads from maintenance, handling, etc. For example, some aircraft parts need to survive usage in airframe locations that have in-service temperatures of between about −54 degrees Celsius and about 225 degrees Celsius.

In particular, in some aspects, objects that exist near areas that are heated to or near engine or exhaust temperatures need to be serviced and handled on the ground in severe winter conditions that may be present above 48 degrees north latitude or at altitude. These conditions require such objects to be comprised of a material having sufficient impact resistance at the low end of the temperature range. Simultaneously, sufficient stiffness and mechanical strength must be maintained at the high end of the temperature range to prevent failure in service.

Accordingly, these objects are manufactured in many different ways. One such way includes introducing granular material (e.g., a high performance polymeric material) into an object forming process, such as for example, a rotational molding process, to form an object suitable for use in an aircraft, or the like. However, currently, it is difficult to viably produce an object from a rotational molding process from high performance polymeric materials due to high coefficients of thermal expansion (e.g., more than about 70 micrometers per millimeter per degree Celsius) of the granular material and difficulty of introducing fibers received in the high performance polymeric materials into the rotational molding process.

Additionally, another such way to manufacture objects includes, for example, introducing the granular thermoplastic materials into an additive manufacturing process. In these instances, however, the granular thermoplastic materials remaining after the additive manufacturing process generally have material properties that exceed threshold values for reusability, which results in any object formed therefrom having undesirable characteristics. In this instance, where the granular material that has been subjected to a particular thermal history, the granular material is considered "aged." For example, use of aged granular thermoplastic material having too high of a melt viscosity and/or average particle size in an additive manufacturing process such as a laser sintering process tends to produce an overly porous object. Accordingly, any of the aged granular thermoplastic material having a material property change that is not conducive to being reused in an additive manufacturing process or for forming an object therefrom is considered waste material and discarded.

In order to prevent such material from being discarded, one approach to reclaiming the aged granular thermoplastic material includes utilizing the aged granular thermoplastic material in a separate and discrete object forming process. For example, rotational molding and lamination are two types of object forming processes that are less sensitive to melt viscosity changes and/or average particle size changes in the aged granular thermoplastic material as compared to laser sintering. However, it is known to those of skill in the art that rotational molding and lamination processes cause distortions in the manufactured object relative to the type of granular thermoplastic material utilized. As a result and as disclosed herein, it is advantageous to form objects from aged granular material having discontinuously distributed fibers and lower coefficients of thermal expansion as compared with high performance polymeric materials, such that thermal and mechanical properties of the objects produced from the aged granular material are improved and the aged granular material, otherwise un-reusable for manufacturing objects, is not discarded.

Referring now to FIG. 1A, elements of an exemplary aged granular material for manufacturing an object (e.g., a part or component for an aircraft) are illustrated. In some aspects and as FIG. 1A illustrates, an exemplary particle of granular material, generally designated 100, comprises a plurality of powder particles including elements comprised of a matrix material 102 having a plurality of reinforcing fibers 104 received therein.

In some aspects, the matrix material 102 comprises a polymeric material, such as, for example, polyamide (PA), high performance polyamide (PPA), polyphenylene sulfide (PPS), polyetheretherketone (PEEK), polyetherketoneketone (PEKK), polyaryletherketone (PAEK), polyethylenimine (PEI), a blend thereof, or other suitable materials. Where the matrix material 102 comprises a blend, the blend comprises at least one metallic material, for example, aluminum, aluminum alloys, titanium, titanium alloys, tungsten, tungsten alloys, vanadium, and vanadium alloys.

In other aspects involving a blend, the polymeric material is blended with other powder materials. These powder materials include, for example, glass beads, hollow glass spheres, minerals, clays, flame retardant additives, color additives, and/or other suitable materials. In some aspects, a flame retardant (FR) additive is blended with the selected polymers. In such instances, a bromine-containing FR, a metal oxide FR, a phosphate based FR, or other FR chemistries are used. Further FRs are disclosed, for example, in U.S. Pat. No. 8,236,418, the entirety of which is incorporated by reference herein.

The plurality of reinforcing fibers 104, in some aspects, include, but are not limited to carbon fibers, glass fibers, polymer fibers, ceramic fibers, and nanofibers of various materials. In one aspect, the plurality of reinforcing fibers 104 are obtained from previously processed material, e.g., recycled or repurposed fiber. For example, in one instance, the plurality of reinforcing fibers 104 are recycled T800 carbon fibers. Such fiber is available by pyrolysis of reinforced materials and the like, or other recycling methods.

FIG. 1B illustrates the plurality of reinforcing fibers 104, prior to being integrated with the matrix material 102, at a 50× magnification. In some aspects, each of the plurality of reinforcing fibers 104 has a tensile modulus of over 280 MPa. More desirably, in some aspects, each of the plurality of reinforcing fibers 104 has a tensile modulus of over 300 MPa, although other tensile moduli are also contemplated. In some aspects, each of the plurality of reinforcing fibers 104 has a fiber diameter of between about 4 micrometers and about 8 micrometers. In a more particular aspect, each of the plurality of reinforcing fibers 104 has a fiber diameter of between about 4 and about 7 micrometers. In yet another aspect, each of the plurality of reinforcing fibers 104 has fiber diameter of between about 4.3 micrometers and about 5.6 micrometers.

In some aspects, the plurality of reinforcing fibers 104 of the present disclosure are of a predetermined length and/or have a predetermined length/diameter ratio that is a target value for the matrix material 102 before and/or after the granular material is prepared. In one aspect, a fiber length distribution prior to an additive manufacturing process is represented by an average fiber length of between about 100 micrometers and about 300 micrometers, with less than 10 percent of the plurality of reinforcing fibers 104 having a fiber length below 10 micrometers, or a fiber length above 750 micrometers. In another aspect, the average fiber length of each of the plurality of reinforcing fibers 104 is about 180 micrometers+/− about 25 micrometers, with less than 5 percent of the fibers having a fiber length below about 50 micrometers, or having a fiber length above about 500 micrometers.

Optionally, the plurality of reinforcing fibers 104 are coated to provide various functionality, such as promoting adhesion to the matrix material 102, providing chemically reactive groups bound to the fiber at one end and available for reaction with the matrix material 102 at the other end, or in-between ends, etc. The plurality of reinforcing fibers 104, in some aspects, are coated, for example, with a thermoset, a thermoplastic, or a metal coating. In other aspects, the fibers are uncoated.

Optionally, the elements of the granular material and/or the components thereof, e.g., the matrix material 102 and/or a plurality of reinforcing fibers 104, are selected for a specific intrinsic property. For example, in one instance, the matrix material 102 and/or the plurality of reinforcing fibers 104 are chosen with respect to their absorption profile of all or part of the infrared, visible, near infrared, and/or microwave spectrum of electromagnetic radiation.

After selection of a fiber material and a fiber length/diameter, as well as a type of matrix material, a batch of the granular material is manufactured (see, e.g., block 202, FIG. 2). For example, manufacture of the granular material comprises integrating a fiber (e.g., reinforcing fiber 104, FIG. 1A) into the material matrix (e.g., a matrix material 102, FIG. 1A) using conventional compounding and extruding equipment. In this manner, the fiber length specification in the granular material is controlled. Other techniques for manufacturing the granular material are also contemplated. With the various manufacturing techniques, the plurality of reinforcing fibers are integrated into the matrix material so that the plurality of reinforcing fibers are encapsulated within or otherwise received by the matrix material.

In some aspects, the content of the plurality of reinforcing fibers in the matrix material is between about 5 weight percent and about 99 weight percent, is preferably between about 10 weight percent and about 75 weight percent, and is even more preferably between about 23 weight percent and about 45 weight percent. Additional information regarding the granular material is found, for example, in U.S. Application Pub. No. 2014/0050921 to Lyons et al., incorporated by reference in its entirety herein.

In some aspects, further processing is performed on the elements (e.g., matrix material 102 and/or the plurality of reinforcing fibers 104) of the granular material before or after integration thereof. Such further processing includes, for example, a particle size reduction process (e.g., impact-based size reduction, shear based size reduction) that is performed on the elements of the granular material to provide a predetermined particle size distribution of the granular material (or elements thereof).

In other aspects, further processing of the elements of the granular material includes pelletizing, cryo-grinding, shaping, polishing, etc. For example, in one instance, the elements of the granular material are thermo-mechanically polished prior to subjecting the granular material to an additive manufacturing process (e.g., laser sintering). Such polishing is advantageous as it is configured to increase bulk density and dry flow characteristics of the elements of the granular material and provide a granular material having properties that render it suitable for use in further forming processes (e.g., rotational molding).

In another example, the elements of the granular material are blended with other materials. In such an instance, the granular material is blended with a matrix material devoid of a plurality of reinforcing fibers. In a further example, a first granular material is blended with a second granular material. In such an instance, the second granular material and the first granular material comprise elements having different characteristics, such as a plurality of reinforcing fibers of different average fiber lengths and/or fiber diameters of different average diameters.

In a still further example, the elements of the granular material are subjected to cryo-grinding. Cryo-grinding is performed in order to fracture the matrix material in a manner that prevents heat generation and detrimental effects to the matrix material, and prevents further dimensional change to the plurality of reinforcing fibers or their relative orientation within the matrix material, such that a free-flowing granular material is obtainable.

FIG. 2 illustrates a flow diagram, generally designated 200, for a method of recovering aged granular material from an additive manufacturing process, such as laser sintering, wherein the aged granular material is subsequently introduced into a molding process, such as rotational molding, in order to form an object therefrom.

In a first step, 202, granular material, such as that described above in reference to FIGS. 1A-1B, is manufactured. Such manufacture includes, in some aspects, integrating a selected matrix material (e.g., matrix material 102, FIG. 1A) with a plurality of reinforcing fibers (e.g., plurality of reinforcing fibers 104, FIG. 1A) such that the plurality of reinforcing fibers are encapsulated by or otherwise received within the matrix material. Elements of the granular material are selected according to different material properties that each element of the overall particle will impart to the final manufactured object. For example, in one instance, the granular material comprises PEKK encapsulated carbon fibers, having a melting point greater than about 300 degrees Celsius.

In a second step, 204, the manufactured granular material is subjected to an additive manufacturing process. For example, the additive manufacturing process is selective laser sintering, selective laser melting, etc. In these examples, the granular material is distributed in layers and selectively heated by an energy source. Accordingly, in step 206, a three-dimensional object is formed from a build-up of the heated layers of the granular material.

However, in some aspects, not all of the granular material subjected to the additive manufacturing process in step 204 is incorporated into the object formed by the additive manufacturing process in step 206. Rather, this leftover granular material is recycled, reclaimed, repurposed, or otherwise reused in the additive manufacturing process, or is considered waste material and discarded, depending on material property changes that have occurred in the elements of the granular material as a result of being included in the additive manufacturing process.

Exposure of such granular material to concentrated heat or energy during an additive manufacturing is associated with elements of the granular material undergoing a change in one or more material properties, such that the granular material is considered "aged." By comparison, "virgin" granular material is the granular material that has not been subjected to such heat or energy, for example, during an additive manufacturing process, such that the elements of the granular material have not undergone a change in the one or more material properties. Such material property changes to the aged elements of the granular material disclosed herein include, for example (but not limited to), a change in melt viscosity, a change in a particle size distribution and/or a change in average particle size within the particle size distribution, a change in specific enthalpy, a change in a properties of the reinforcing fiber (e.g., fiber length, fiber diameter, fiber orientation), a change in fiber content in consolidated particles, a change in a coefficient of thermal expansion, a change in heat of crystallization, and the like.

In some aspects, the change in the material properties of the elements of the aged granular material are sufficiently minor that the aged granular material is able to be reused in the additive manufacturing process. More particularly, particles of the aged granular material that meet certain threshold values, such as, for example, are less than a threshold average particle size, are able to be reused in the additive manufacturing process in step 204. Thus, the elements of the aged granular material are analyzed in order to determine the material properties thereof. For example, a non-destructive analysis relying on electromagnetic radiation, sound, microscopy, etc., is used in order to analyze the elements of the granular material.

In this manner, in step 208, elements of the aged granular material meeting certain threshold values are isolated from elements of the granular material not meeting the threshold values. Notably, the threshold values prevent aged granular material having undesirable material properties from being reused for manufacturing an object in the additive manufacturing process and thereby imputing those undesirable properties to or causing other undesirable effects in the manufactured object. For example, in one instance, it is desirable for the elements of the granular material reused in the additive manufacturing process to have a particle size distribution of between about 20 micrometers and about 150 micrometers with an average particle size of between about 75 and about 125 micrometers in order to prevent excessive porosity in a part or object formed therefrom.

In some aspects, isolation in step 208 is accomplished using a mechanical sifting process. For example, in one instance, a vibratory sifting mechanism is configured with a screen having an aperture size capable of isolating and removing particles having an average particle size of greater than about, for example, 50 micrometers. Accordingly, in step 210A, the aged granular material to be reused in the additive manufacturing process in step 204 comprises elements having lesser particle sizes (e.g., elements in a range in particle size of between about 20 micrometers and about 150 micrometers) across an increased particle size distribution, which are isolated from greater particle size elements (e.g., elements in a range in particle size of between about 50 micrometers and about 595 micrometers) within the increased particle size distribution prior to reuse. Generally, in some aspects and based on such exemplary criteria, between about 30 percent and about 70 percent of the aged granular material (i.e., having an average particle size of 50 micrometers or less) is reusable in the additive manufacturing process in step 204.

Consequently, in step 210B, the granular material to be discarded or not reused in the additive manufacturing process includes elements having a range in particle size of between about 50 micrometers and about 595 micrometers, as well as a melt viscosity of between about 5 and about 15 grams per 10 minutes, a specific enthalpy of first melt of between about 40 and about 50 Joules per gram, a coefficient of thermal expansion of about 50 micrometers per millimeter per degrees Celsius, and/or a heat of crystallization greater than about 40 Joules per gram. More particularly, in one example, a $90^{th}$ percentile of the particles of the exemplary aged granular material within the particle size distribution have an average particle size of between about 150 and about 595 micrometers, while a $10^{th}$ percentile of the particles of the exemplary aged granular material within the particle size distribution have an average particle size of between about 50 and about 150 micrometers. In this instance, an average particle size is between about 80 micrometers and about 200 micrometers.

Moreover, the aged granular material in step 210B comprises a plurality of reinforcing fibers encapsulated by the matrix material, wherein the fibers are distributed within each particle of the granular material in a predominantly random orientation (see, e.g., 104, FIG. 1A) such that the particle demonstrates essentially anisotropic properties in at least two dimensions. In some aspects, a reinforcing fiber content of each particle of the exemplary aged granular material is between about 20 and about 50 percent by weight; preferably about 23 percent by weight. In some aspects, an average fiber length of the plurality of reinforcing fibers is between about 100 micrometers and about 500 micrometers, while an average fiber diameter of the plurality of reinforcing fibers is between about 4 micrometers and about 8 micrometers.

In step 212, the aged and isolated granular material from step 210B is optionally processed. For example, in one instance, this isolated granular material is sifted to remove any sacrificial or melted particles remaining from the additive manufacturing process in step 204. In another example, the isolated granular material is further resized such that only the aged and isolated granular material meeting a threshold value (i.e., a threshold average particle size) is used in the molding process in step 214.

In step 214, the aged and isolated granular material from step 212 is introduced into a molding process so as to form an object therefrom. For example, in some aspects, the molding process is a rotational molding process comprising a hollow mold into which the aged and isolated granular material is introduced. In this instance, the hollow mold is then rotated bi-axially in an oven or other heating element until the granular material melts and coats an inside of a cavity of the hollow mold.

In step 216, an object (e.g., an aircraft part or component) is formed from the rotational molding process. For example, an object is formed comprising a granular material including elements comprising a matrix material having a plurality of reinforcing fibers received therein, the elements of the granular material having a melt viscosity of between about 5 and about 15 grams per 10 minutes and a particle size distribution with a range in particle size of between about 50 and about 595 micrometers. As compared with objects formed from a molding process using traditional high performance polymeric materials, the object disclosed herein comprises a lower coefficient of thermal expansion (e.g., less than about 50 micrometers per millimeter per degree Celsius, and preferably less than about 40 micrometers per millimeter per degree Celsius) that reduces cracking of the formed object.

Additionally, an object formed from the rotational molding process in step 216 from the aged and isolated granular material (e.g., 100, FIG. 1A) comprises precisely molded, fine features as the aged and isolated granular material comprises elements including evenly distributed fibers that evenly coat the inside of the cavity of the rotational mold so that fine features of an object are moldable. More particularly, the plurality of reinforcing fibers are evenly distributed by way of multi-directional forces applied thereto during the accelerations of the rotomolding process. By comparison, in laser sintering, no forces are applied to the particles of the granular material after the particles are evenly distributed, and therefore, the plurality of reinforcing fibers will tend to be more randomly distributed.

Reference is now being made to FIG. 3, which illustrates a method flow diagram, generally designated 300, of a method of manufacturing an object from an aged granular material.

In step 302, a granular material is introduced into a molding process so as to form the object therefrom, the granular material including elements comprising a matrix material having a plurality of reinforcing fibers received therein, the elements of the granular material having a melt viscosity of between about 5 and about 15 grams per 10 minutes and a particle size distribution with a range in particle size of between about 50 and about 595 micrometers Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that equivalents, modifications, and other aspects are intended to be included within the scope of the appended claims. Although specific terms are employed herein, they are used in a generic and descriptive sense only and not for purposes of limitation.

That which is claimed:

1. A method of manufacturing an object, the method comprising:
    subjecting virgin granular material including a combination of elements comprising a matrix material having a plurality of reinforcing fibers received therein to heat in an additive manufacturing process to form an aged granular material, the combination of elements of the aged granular material having a melt viscosity of between about 5 and about 15 grams per 10 minutes, a particle size distribution with a range in particle size of between about 50 and about 595 micrometers, an average specific enthalpy of first melt of between about 40 and about 50 Joules per gram, an average coefficient of thermal expansion of about 50 micrometers per millimeter per degrees Celsius, and an average heat of crystallization greater than about 40 Joules per gram; and
    introducing the aged granular material into a molding process so as to form the object therefrom.

2. The method according to claim 1, wherein during introducing the aged granular material into the molding process, the plurality of reinforcing fibers received in the matrix material have an average fiber length of between about 100 micrometers and about 500 micrometers and an average fiber diameter of between about 4 micrometers and about 8 micrometers, and wherein a fiber content of the plurality of reinforcing fibers in the aged granular material is between about 20 and about 50 percent by weight.

3. The method according to claim 1, wherein subjecting the virgin granular material to the additive manufacturing process occurs prior to introducing the aged granular material into the molding process, and includes a heating step affecting an increase in the particle size distribution of the elements of the virgin granular material.

4. The method according to claim 3, wherein subjecting the virgin granular material to the additive manufacturing process includes the heating step affecting the increase in the particle size distribution of the elements of the virgin granular material such that the increased particle size distribution comprises an average particle size of between about 80 and about 200 micrometers.

5. The method according to claim 3, comprising isolating greater particle size elements of the aged granular material within the increased particle size distribution and associated with the melt viscosity of between about 5 and about 15 grams per 10 minutes from lesser particle size elements of the aged granular material within the increased particle size distribution.

6. The method according to claim 5, wherein isolating the greater particle size elements of the aged granular material comprises sifting the elements of the aged granular material to separate the lesser particle size elements for reusing in the additive manufacturing process from the greater particle size elements, for introducing into the molding process.

7. The method according to claim 6, comprising resizing the greater particle size elements to a substantially uniform average particle size.

8. The method according to claim 1, wherein introducing the aged granular material into the molding process comprises introducing the aged granular material into a rotational molding process.

9. An aged granular material for manufacturing an object, comprising:
    a combination of elements comprising a matrix material having a plurality of reinforcing fibers received therein, the combination of the elements being formed from virgin granular material subjected at least to heat in an additive manufacturing process and having an average melt viscosity of between about 5 and about 15 grams per 10 minutes, and a particle size distribution with a range in particle size of between about 50 and about 595 micrometers,
    wherein the combination of elements of the aged granular material has an average specific enthalpy of first melt of between about 40 and about 50 Joules per gram, an average coefficient of thermal expansion of about 50 micrometers per millimeter per degrees Celsius, and an average heat of crystallization greater than about 40 Joules per gram.

10. The aged granular material according to claim 9, wherein the plurality of reinforcing fibers received in the matrix material have an average fiber length of between about 100 micrometers and about 500 micrometers and an average fiber diameter of between about 4 micrometers and about 8 micrometers, and wherein a fiber content of the plurality of reinforcing fibers in the aged granular material is between about 20 and about 50 percent by weight.

11. The aged granular material according to claim 9, wherein the particle size distribution comprises an average particle size of between about 80 and about 200 micrometers.

12. The aged granular material according to claim 9, wherein the combination of elements of the aged granular material having the particle size distribution comprise greater particle size elements relative to lesser particle size elements within the particle size distribution, the greater particle size elements of the aged granular material being associated with the melt viscosity of between about 5 and about 15 grams per 10 minutes being isolated from the lesser particle size elements of the aged granular material.

13. An object comprising:
    an aged granular material including a combination of elements comprising a matrix material having a plurality of reinforcing fibers received therein, the combination of the elements of the aged granular material being formed from virgin granular material subjected at least to heat in an additive manufacturing process and having an average melt viscosity of between about 5 and about 15 grams per 10 minutes and a particle size distribution with a range in particle size of between about 50 and about 595 micrometers,
    wherein the combination of elements of the aged granular material has an average specific enthalpy of first melt of between about 40 and about 50 Joules per gram, an average coefficient of thermal expansion of about 50 micrometers per millimeter per degrees Celsius, and an average heat of crystallization greater than about 40 Joules per gram.

14. The object according to claim 13, wherein the particle size distribution comprises an average particle size of between about 80 and about 200 micrometers.

15. The object according to claim 13, wherein some of the combination of the elements of the aged granular material having the particle size distribution comprise greater particle size elements relative to lesser particle size elements within the particle size distribution, the greater particle size elements of the aged granular material being associated with the melt viscosity of between about 5 and about 15 grams per 10 minutes being isolated from the lesser particle size elements of the aged granular material.

* * * * *